United States Patent Office 3,117,856
Patented Jan. 14, 1964

3,117,856
METHOD FOR PROMOTING PLANT GROWTH
Walter A. Darlington, Dayton, Ohio, assignor to Monsanto Chemical Company, St. Louis, Mo., a corporation of Delaware
No Drawing. Filed Nov. 10, 1960, Ser. No. 68,347
12 Claims. (Cl. 71—2.7)

The invention relates to a method of treating plants to promote their growth with compositions having mixtures of oleic and linoleic acids and/or esters thereof.

The surprising discovery has been made that oleic and linoleic acids and/or esters when mixed show synergism as to plant growth promoting activity. It is preferred to apply these plant growth regulants to plants as compositions with inert carriers. Preferred esters are esters of the formulas $CH_3(CH_2)_7CH=CH(CH_2)_7COOR$ and $CH_3(CH_2)_4CH=CHCH_2CH=CH(CH_2)_7COOR$ wherein the R's are aliphatic hydrocarbon radicals preferably having not more than 12 carbon atoms and more preferably not more than 8 carbon atoms.

It is an object of this invention to provide a new and improved method for promoting plant growth involving the application of newly discovered synergistic plant-growth-promoting mixtures.

These and other objects of the invention will become apparent as the detailed description of the invention proceeds.

An illustrative but non-limiting list of suitable oleate and linoleate esters of the invention are as follows: methyl, ethyl, n-propyl, isopropyl, allyl, propargyl, n-butyl, isobutyl, sec-butyl, t-butyl, n-amyl, isoamyl, t-amyl, n-hexyl, n-octyl, 2-ethylhexyl, capryl, n-decyl, t-dodecyl and lauryl esters, etc.

An especially suitable source of mixed oleic and linoleic acids for use in the invention are the fatty acids derived from the fractionation of tall oil. A typical sample of these acids is composed of about 2% rosin acids, 2% unsaponifiable material, 2% saturated fatty acids, 46% linoleic acid and 48% oleic acid. These tall oil fatty acids are usable as is in the method of the invention, or can be esterified with alcohols to form the desired esters usable in the invention. Alternatively oleic and linoleic acids derived from other sources can be mixed and esterified, if desired, for use in the method of the invention. A synergistic mixture can consist of oleic acid and an ester of linoleic acid or the reverse or, for example, the synergistic mixture can consist of methyl oleate plus n-butyl linoleate. Also if desired mixtures of different alcohols can be used to esterify either or both the oleic and the linoleic acids. The synergistic effect in growth promotion will be evident to a degree when the mixture is composed of from about 5% to about 95% of oleic acid and/or oleate esters with the balance being composed of the linoleic acid and/or esters. Preferred compositions will contain approximately equal amounts by weight of each component as is found in tall oil. Normally as a practical matter it will be preferred to use the saturated straight chain alcohols to esterify the acid components of the mixture.

It is preferred to apply the mixed acids and esters in concentrations in the range of about 0.0001% to about 1.0%, more preferably in the range of about 0.001% to about 0.1% in an inert carrier. Normally the mixed acids and esters will be applied to plants at rates in the range of about 0.1 to about 50 pounds per acre, preferably in the range of about ½ to about 10 pounds per acre. The growth-promoting chemicals of the invention can be applied to the plant in a number of different ways, but it is preferred to apply them by spraying the plant with a water solution or suspension of the chemicals in at least a sufficient concentration to promote the growth of the plant as desired. The chemical compounds can also be applied to plants by spraying, dipping in the case of potted plants, dusting with the chemicals dispersed in an inert powder, or by other conventional means. An additional method of applying would be by suspending a small particle of the chemical in a stream of air or other gas, and spraying the plant with this suspension. The chemical can even be sprinkled on the plants in undiluted or powdered form if desired. If the chemical is applied in diluted form as will usually be desirable, it will be applied in as concentrated a solution as is readily handieable and which will not cause substantial phytotoxic damage to the plant being treated. The amount of the chemicals applied to the plant must be at least in sufficient quantity to promote the growth of the particular plants being treated and in sufficient concentration to cause the growth promotion. This will vary to a degree with the plant being treated and what type of growth it is that it is desired to promote.

If the chemical is applied in water diluent and is soluble in water, of course, no dispersant will be necessary although a wetting agent may still be desirable for maximum effectiveness. If the chemical is not very soluble in water an emulsifying agent may be required to keep it dispersed such as, e.g., alkylbenzenesulfonates, polyalkylene glycols, salts of sulfated long-chain alcohols, sorbitan fatty acid esters, etc., and other emulsifying agents which can be used are listed, e.g., in the U.S. Department of Agriculture Bulletin No. E607. The active chemicals of the invention can also be applied, dissolved or dispersed in organic solvents, e.g., liquid hydrocarbons, provided they are substantially non-phytotoxic to the plants. If applied admixed with an inert pulverulent carrier, such carriers, as e.g., talc, bentonite, kieselguhr, diatomaceous earth, etc., can be used.

The invention will be more clearly understood from the following detailed description of specific examples thereof.

*Example 1*

This example describes the growth-promoting effect on pinto beans of some compositions of the invention. In the tests the bean plants were treated 7 days after seeding. Each plant was treated by tip-treating it with 0.01 ml. of solution. In the case of the control plants, they were treated with 0.01 ml. of 50% ethanol whereas the other plants were treated with a 0.1% by weight concentration of the test chemical in 50% ethanol. These tests were conducted in the greenhouse. Growth estimates were made two weeks after treatment based on the average height of the plants in each group. Results of these tests are reported in the table which follows:

| Test No. | Treating Agent [1] | Comparative Growth, Percent |
|---|---|---|
| 1 | Control (50% ethanol) | 100 |
| 2 | Methyl linoleate | 64 |
| 3 | Methyl oleate | 123 |
| 4 | 50/50 Mix of methyl oleate and methyl linoleate | 215 |
| 5 | Tall Oil fatty acids [2] | 175 |
| 6 | Methyl ester of Tall Oil fatty acids | 215 |
| 7 | n-Butyl ester of Tall Oil fatty acids | 300 |

[1] The control was 50% ethanol, and the other treating agents consisted of 0.1% by weight of the chemicals in 50% ethanol.
[2] The composition of typical tall oil fatty acids is described hereinabove.

It is seen from an examination of the data in the table above that methyl linoleate gives a 36% inhibition of the growth of the beans as compared to a 23% stimulation by methyl oleate. It would be expected then that a mixture of the two in proportions of 50/50 would give a slight inhibition of growth of the bean plants; however, very surprisingly a 50/50 mixture of these two esters (0.05% of each in 50% ethanol) gives a 115% increase in growth as compared to the control. It is further indicated in the data of the table that essentially a 50/50 mixture of oleic and linoleic acid, i.e., the tall oil fatty acids, gives a 75% increase in growth of the beans. Methyl esters of the tall oil fatty acids give the same growth increase, namely 115% as the 50/50 mixture of the methyl esters shown above. It further appears from the data in the table that the n-butyl esters of tall oil fatty acids are appreciably better than the methyl esters giving a 200% increase in growth of the beans as compared to the control.

*Example 2*

This example describes the growth promoting effects of some of the compositions of the invention on two different varieties of peas; namely Alaska peas and Little Marvel peas. In the tests about 15 plants were used in each different test group. At the end of a 14 day period after seeding the peas the chemical treatment of the plants was made. Each plant was sprayed with 1 ml. of a test solution. The controls were sprayed with 1 ml. of a 5% ethanol solution containing 0.1% (Atlox 1256), and the other plants were sprayed with 1 ml. of the same solution containing 0.01% by weight of the test chemical. The Alaska peas were harvested 57 days after planting and the Little Marvel peas 77 days after planting. The following observations were made: For the n-butyl esters of tall oil fatty acids, the flowering of Alaska peas was hastened, plant heights increased with Little Marvel peas, fresh weight increased for the Little Marvel pea tops (not including roots), and increased dry weight yields of peas were obtained in both varieties. It was further observed that the tall oil fatty acids also hastened the flowering of Alaska peas. The overall conclusion from these tests on peas although reported qualitatively are that the compositions of the invention show promising growth promoting qualities for application to the peas.

*Example 3*

This example reports the effect of some compositions of the invention on the root growth of lettuce. This example involves the treatment of the lettuce seeds. Acetone was the control chemical and 0.1% by weight of the test chemicals in acetone were compared to the control. Using a number of seeds in each treatment group one group of about 100 seeds were treated with 10 ml. of a test solution by percolating the solution over the seeds on a filter paper. After the treatment, the seeds were allowed to dry for ½ hour to allow the acetone to evaporate. Then the seeds were placed on moist filter paper in Petri dishes under fluorescent light. After a period of 48 hours after chemical treatment the 5 longest roots in each test group were measured. It was concluded from these tests that both the tall oil fatty acids and the butyl esters thereof significantly stimulated lettuce root growth.

*Example 4*

This example describes the flowering stimulation effect of compositions of the invention on 4½ month old geraniums. Again the control chemical is 5% ethanol containing 0.1% (Atlox 1256) and the test chemicals are incorporated in the solution to a concentration of 100 p.p.m. 6 ml. was sprayed on each plant, and there were five plants in each test group. Observations of the plants were made over a period of 6 weeks after treatment. The conclusions of this test were that both the tall oil fatty acids and the butyl esters thereof stimulated flower formation in the geranium, i.e., promoted the formation of more flowers than on the control.

Although the invention has been described in terms of specified embodiments which are set forth in considerable detail, it should be understood that this is by way of illustration only and that the invention is not necessarily limited thereto, since alternative embodiments and operating techniques will become apparent to those skilled in the art in view of the disclosure. For example, the term "hydrocarbon" used in conjunction with the ester radicals has been used in its broader sense, in that these radicals can contain substituents such as halogen, nitro, nitrile, etc., to the extent that these substituents do not destroy the growth-promoting activity of the chemicals of the invention and may in some cases to a degree promote such activity. One skilled in the art will recognize that a compound having an ester group containing a non-interfering group is the equivalent of the corresponding compounds having an ester group containing only carbon and hydrogen. Accordingly, modifications are contemplated which can be made without departing from the spirit of the described invention.

What is claimed is:

1. A method of promoting plant growth consisting of treating plant foliage with a composition comprising a major amount of an inert carrier and a growth-promoting quantity of a mixture consisting essentially of about 5% to about 95% by weight of a compound of the formula $CH_3(CH_2)_7CH=CH(CH_2)_7COOR$ wherein R is selected form the class consisting of hydrogen and aliphatic hydrocarbon radicals having not more than 12 carbon atoms and substantially all of the balance of said mixture is a compound of the formula $$CH_3(CH_2)_4CH=CHCH_2CH=CH(CH_2)_7COOR$$

wherein R is as defined hereinabove.

2. A method of claim 1 wherein bean plants are the plants treated.

3. A method of claim 1 wherein pea plants are the plants treated.

4. A method of promoting plant growth consisting of treating plant seeds prior to planting the seeds with a composition comprising a major amount of an inert carrier and a growth-promoting quantity of a mixture consisting essentially of about 5% to about 95% by weight of a compound of the formula $$CH_3(CH_2)_7CH=CH(CH_2)_7COOR$$

wherein R is selected from the class consisting of hydrogen and aliphatic hydrocarbon radicals having not more than 12 carbon atoms and substantially all of the balance of said mixture is a compound of the formula $CH_3(CH_2)_4CH=CHCH_2CH=CH(CH_2)_7COOR$ wherein R is as defined hereinabove.

5. A method of claim 4 wherein lettuce seeds are treated.

6. A method of claim 1 wherein geranium plants are treated to promote flowering.

7. A method of claim 1 wherein said mixture is tall oil fatty acids.

8. A method of claim 1 wherein said mixture is methyl esters of tall oil fatty acids.

9. A method of claim 1 wherein said mixture is n-butyl esters of tall oil fatty acids.

10. A method of claim 1 wherein R is a straight-chain alkyl radical having not more than 8 carbon atoms.

11. A method of claim 10 wherein said mixture is about a 50/50 mixture of oleic and linoleic esters.

12. A method of claim 11 wherein said esters are methyl esters.

References Cited in the file of this patent

UNITED STATES PATENTS 2,799,973     Smith _____ July 23, 1957
2,867,944     Fletcher _____ Jan. 13, 1959